United States Patent
Ando et al.

(10) Patent No.: US 10,379,486 B2
(45) Date of Patent: Aug. 13, 2019

(54) TRANSPORT MEMBER, TRANSPORT DEVICE, AND IMAGE FORMING DEVICE

(71) Applicant: FUJI XEROX CO., LTD., Tokyo (JP)

(72) Inventors: Hiroki Ando, Kanagawa (JP); Akihiro Nonaka, Kanagawa (JP); Yuzo Ichikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/940,984

(22) Filed: Mar. 30, 2018

(65) Prior Publication Data

US 2018/0284687 A1    Oct. 4, 2018

(30) Foreign Application Priority Data

Apr. 4, 2017   (JP) .................. 2017-074846

(51) Int. Cl.
```
G03G 21/10     (2006.01)
B65G 33/26     (2006.01)
B65G 33/14     (2006.01)
```
(52) U.S. Cl.
CPC ........... G03G 21/105 (2013.01); B65G 33/14 (2013.01); B65G 33/265 (2013.01)

(58) Field of Classification Search
CPC ...... G03G 21/105; B65G 33/14; B65G 33/16; B65G 33/265
See application file for complete search history.

(56) References Cited

U.S. PATENT DOCUMENTS

| 4,198,802 A * | 4/1980 | Hengen ................. A01F 12/442 56/14.6 |
| 8,346,151 B2 | 1/2013 | Akaike et al. |
| 2010/0239340 A1* | 9/2010 | Akaike ................ G03G 21/105 399/358 |
| 2015/0346638 A1* | 12/2015 | Mizusawa .......... G03G 15/0891 399/358 |

FOREIGN PATENT DOCUMENTS

| JP | 2002311773 | 10/2002 |
| JP | 2007256740 | 10/2007 |
| JP | 2007286322 | 11/2007 |
| JP | 2010224004 | 10/2010 |

* cited by examiner

Primary Examiner — David M. Gray
Assistant Examiner — Michael A Harrison
(74) Attorney, Agent, or Firm — JCIPRNET (57) ABSTRACT

A transport member includes: a shaft portion having a linear portion that is linearly disposed along a linear section of a transport path, and a curved portion that is curvedly disposed along a curved section of the transport path; and screw blades that are spirally formed on an outer circumferential surface of the linear portion and the curved portion, and that transport a powder material by rotation of the shaft portion in one of axial directions of the shaft portion, the screw blades having a small-diameter portion which has an outer diameter smaller in the curved portion than in the linear portion.

19 Claims, 8 Drawing Sheets

TRANSPORT MEMBER, TRANSPORT DEVICE, AND IMAGE FORMING DEVICE

CROSS-REFERENCE TO RELATED APPLICATIONS

This application is based on and claims priority under 35 USC 119 from Japanese Patent Application No. 2017-074846 filed on Apr. 4, 2017.

BACKGROUND

Technical Field

The present invention relates to a transport member, a transport device, and an image forming device.

SUMMARY

According to an aspect of the invention, there is provided a transport member including: a shaft portion having a linear portion that is linearly disposed along a linear section of a transport path, and a curved portion that is curvedly disposed along a curved section of the transport path; and screw blades that are spirally formed on an outer circumferential surface of the linear portion and the curved portion, and that transport a powder material by rotation of the shaft portion in one of axial directions of the shaft portion, the screw blades having a small-diameter portion which has an outer diameter smaller in the curved portion than in the linear portion.

BRIEF DESCRIPTION OF THE DRAWINGS

Exemplary embodiments of the present invention will be described in detail based on the following figures, wherein.

DETAILED DESCRIPTION

Hereinafter, an example of an exemplary embodiment according to the invention will be described based on the drawings. It is to be noted that an arrow Y direction, an arrow X direction, and an arrow Z direction are illustrated as needed in each of the diagrams. The arrow Y direction indicates the upper direction of a device. The arrow Z direction indicates the axial direction of the later-described photoconductor drum 20. The arrow X direction indicates a direction which crosses the arrow Y direction and the arrow Z direction.

(Image Forming Device 10)

Figure 1:
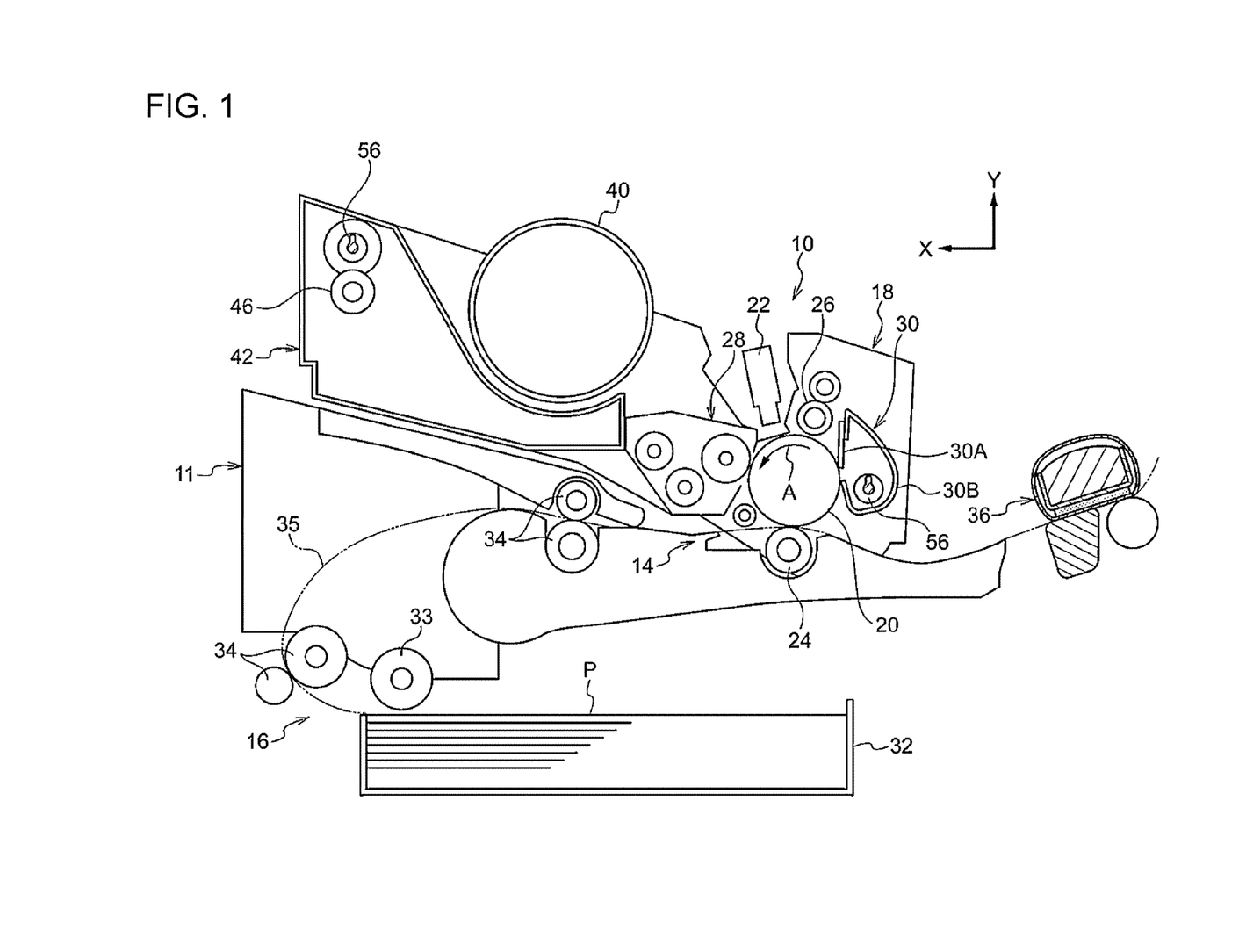
FIG. 1 is a schematic view illustrating the configuration of an image forming device according to this exemplary embodiment.

First, the configuration of an image forming device 10 according to this exemplary embodiment will be described. FIG. 1 is a schematic view illustrating the configuration of the image forming device 10 according to this exemplary embodiment.

As illustrated in FIG. 1, the image forming device 10 includes a storage 32 that stores a recording medium P such as a sheet of paper, an image former 14 that forms an image on the recording medium P, a fixing device 36 that fixes an image, formed on the recording medium P by the image former 14, to the recording medium P, and a transporter 16 that transports the recording medium P from the storage 32 to the image former 14.

The image former 14 has a function of forming an image on the recording medium P using toner which is an example of a powder material. Specifically, the image former 14 has a photoconductor drum 20, serving as a retention body, that retains an image (latent image). The photoconductor drum 20 is designed to be rotated in one direction (the arrow A direction). In the surroundings of the photoconductor drum 20, a charging roller 26 serving as a charging device, an exposure device 22, a developing device 28, a transfer roller 24 serving as a transfer unit, and a remover 30 are provided in that order from the upstream side of the photoconductor drum 20 in the rotation direction.

The charging roller 26 has a function of charging the photoconductor drum 20. The exposure device 22 has a function of exposing the photoconductor drum 20 charged by the charging roller 26 to light, and forming an electrostatic latent image on the photoconductor drum 20.

The developing device 28 has a function of forming a toner image by developing an electrostatic latent image using toner, which is formed on the photoconductor drum 20 by the exposure device 22. The transfer roller 24 has a function of transferring a toner image, formed on the photoconductor drum 20 by the developing device 28, to the recording medium P.

The remover 30 has a function of removing remaining toner on the surface of the photoconductor drum 20 after the transfer. Specifically, the remover 30 has a blade 30A that comes into contact with the surface of the photoconductor drum 20 to remove (scrape off) toner as a removing member, and a storage 30B that stores the toner removed by the blade 30A.

The transporter 16 includes a delivering roller 33 that delivers the recording medium P stored in the storage 32, a transport path 35 along which the recording medium P delivered by the delivering roller 33 is transported, and multiple pairs of transport rollers 34 that transport the recording medium P, delivered by the delivering roller 33 along the transport path 35, between the photoconductor drum 20 and the transfer rollers 24.

The fixing device 36 is designed to fix a toner image, transferred to the recording medium P by the transfer roller 24, to the recording medium P by heating and pressurizing the recording medium P.

In addition, the image forming device 10 includes a detachable body 18 that is detachably provided in an image forming device body 11. The detachable body 18 is provided with the above-described photoconductor drum 20, the charging roller 26, the developing device 28, and the remover 30. The detachable body 18 is provided with the photoconductor drum 20, the charging roller 26, the developing device 28, and the remover 30 like this, and thus is configured as a process cartridge that is replaceable in the image forming device body 11.

Figure 2:
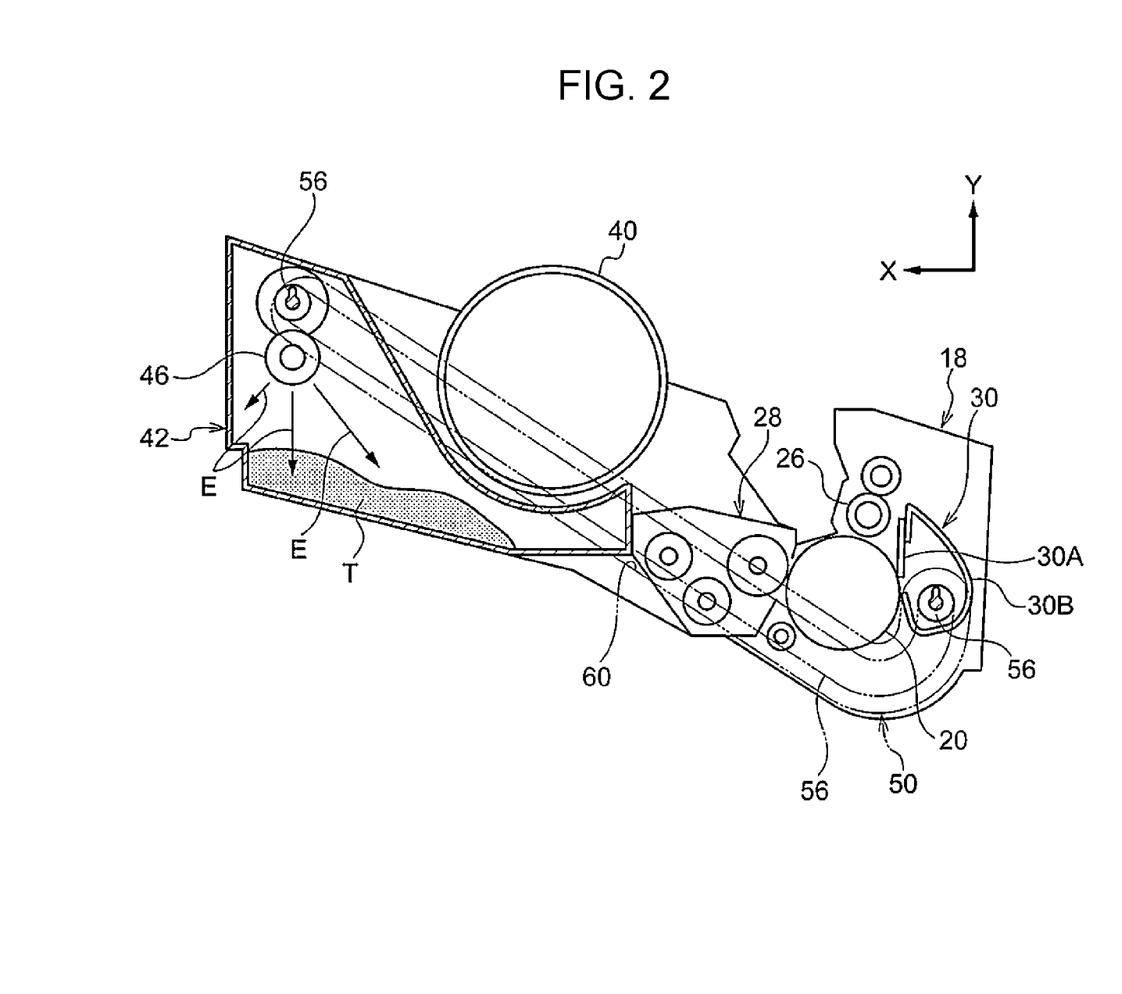
FIG. 2 is a schematic view illustrating the configuration of part of the image forming device illustrated in FIG. 1.

In addition, the detachable body 18 is provided with a toner cartridge 40 that stores toner to be supplied to the developing device 28. Also, as illustrated in FIG. 2, the detachable body 18 is provided with a transport device 50 that transports toner removed by the remover 30, and a waste toner box 42, serving as a reservoir, that reserves the toner transported by the transport device 50. The waste toner box 42 is disposed on the side in the X direction of the remover 30.

Figure 3:
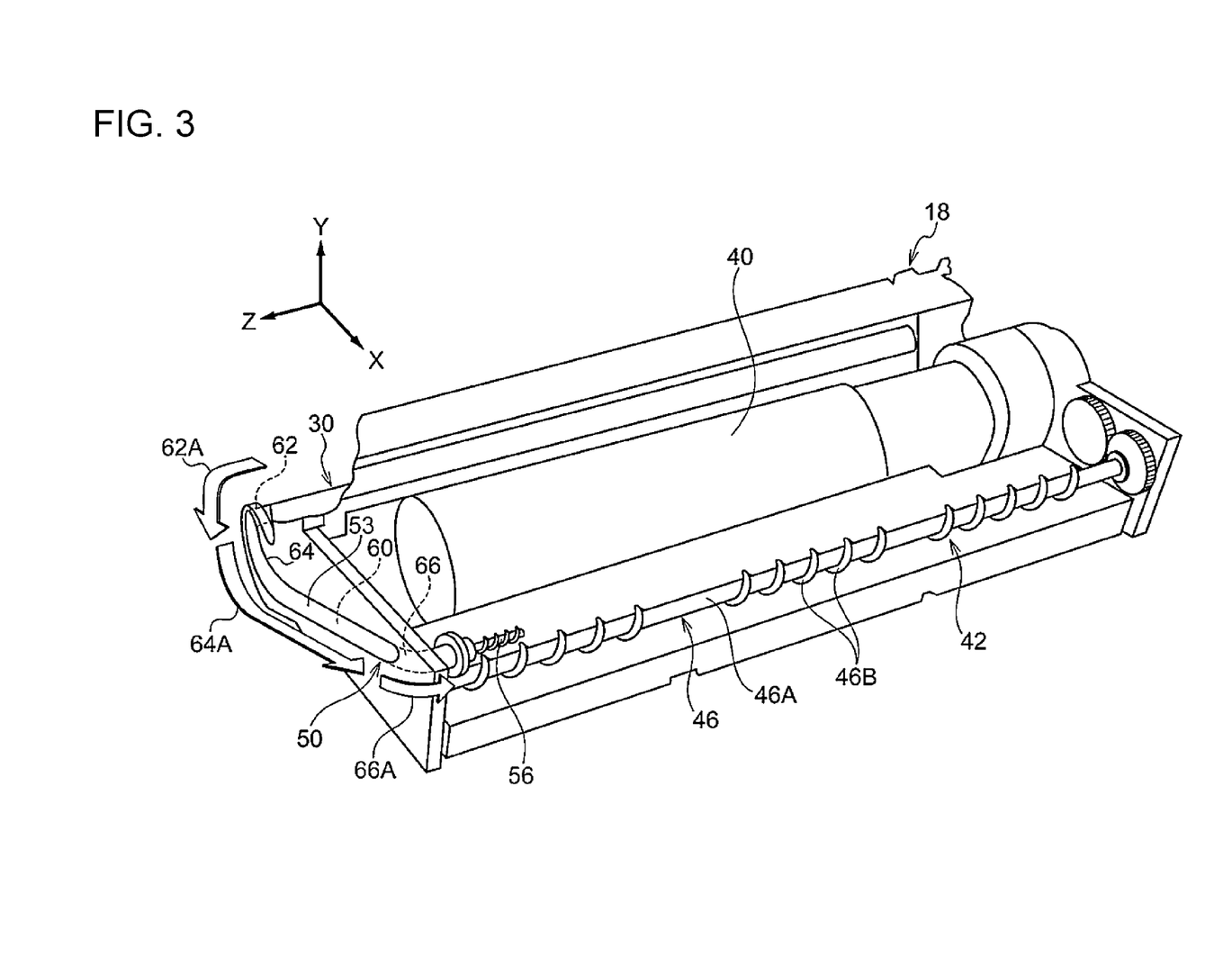
FIG. 3 is a perspective view illustrating the configuration of a process cartridge according to this exemplary embodiment.

As illustrated in FIGS. 2 and 3, a transport body 46 that transports toner is provided inside the waste toner box 42. The transport body 46 has a shaft portion 46A, and screw blades 46B that are spirally formed on the outer circumferential surface of the shaft portion 46A in a circumferential direction of the shaft portion 46A. In the transport body 46, rotation of the shaft portion 46A causes the screw blades 46B to transport toner in the axial direction and the radial direction of the shaft portion 46A (see arrow E directions of FIG. 2). It is to be noted that FIG. 3 illustrates the detachable body 18 in a state where the inside of the waste toner box 42 is open.

(Transport Device 50)

Next, the specific configuration of the transport device 50 will be described.

The transport device 50 has a function of transporting toner as an example of a powder material. Specifically, as illustrated in FIG. 4, the transport device 50 has a transport path 60, a transport member 56, and a driving motor 59 serving as a driver.

As illustrated in FIG. 2, the transport path 60 is a path along which toner is transported from the storage 30B of the remover 30 to the waste toner box 42, and is formed inside a transport pipe 53 (see FIG. 3).

Figure 4:
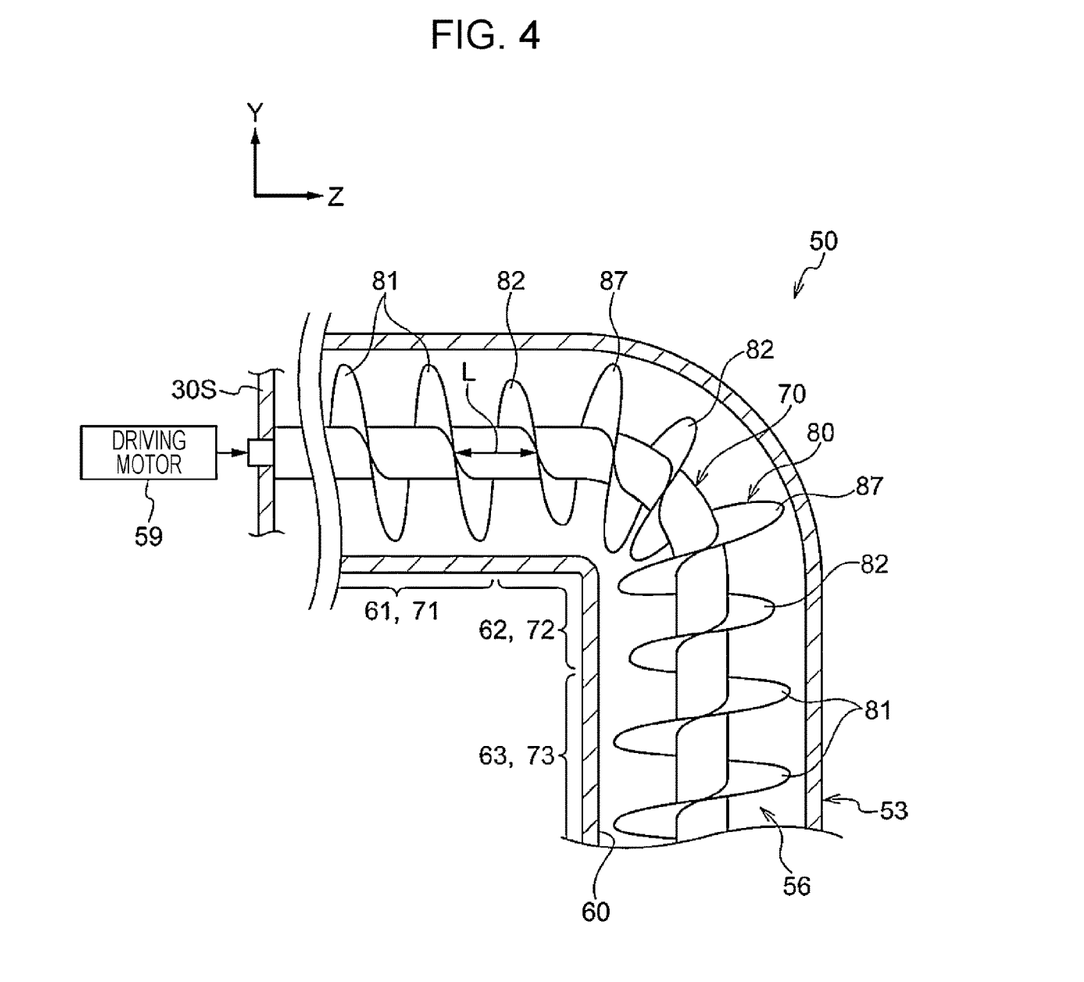
FIG. 4 is a cross sectional view illustrating the configuration of a curved section which has a relatively less curvature of a transport path in a transport device according to this exemplary embodiment.
Figure 5:
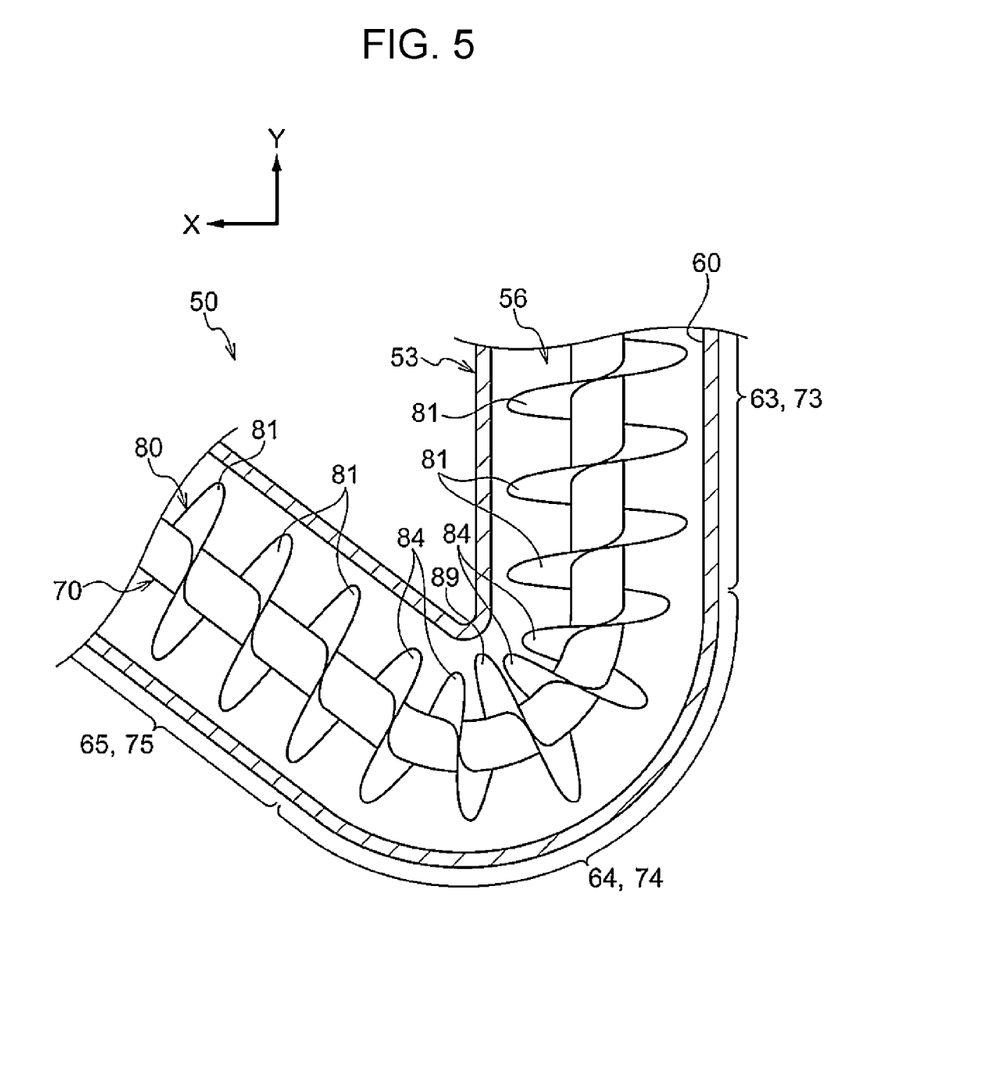
FIG. 5 is a cross sectional view illustrating the configuration of a curved section which has a relatively greater curvature of a transport path in a transport device according to this exemplary embodiment.

As illustrated in FIGS. 3, 4, and 5, the transport path 60 has linear sections 61, 63, and 65 that linearly extend, and curved sections 62, 64, and 66 that are curved.

As illustrated in FIG. 4, the linear section 61 linearly extends in a horizontal direction (Z direction). As illustrated in FIGS. 4 and 5, the linear section 63 linearly extends in a downward direction. As illustrated in FIG. 5, the linear section 65 linearly extends in an upward diagonal direction.

As illustrated in FIG. 4, the curved section 62 is curved so that the transport direction is changed from the horizontal direction (Z direction) to the downward direction between the linear section 61 and the linear section 63 (see an arrow 62A of FIG. 3). As illustrated in FIG. 5, the curved section 64 is curved so that the transport direction is changed from the downward direction to the upward diagonal direction between the linear section 63 and the linear section 65 (see an arrow 64A of FIG. 3). As illustrated in FIG. 3, the curved section 66 is curved so that the transport direction is changed from the upward diagonal direction to the horizontal direction (see an arrow 66A of FIG. 3).

The curved section 62 and the curved section 66 have substantially the same curvature. The curved section 64 has a curvature greater than the curvature of the curved section 62 and the curved section 66. It is to be noted that the bending angle of the curved section 64 is also made greater than the bending angle of the curved section 62 and the curved section 66.

The transport member 56 has a function of transporting toner, and is disposed in the transport path 60 as illustrated in FIG. 4. Specifically, the transport member 56 has a shaft portion 70, and screw blades 80 that are spirally formed on the outer circumferential surface of the shaft portion 70 in a circumferential direction of the shaft portion 70.

The shaft portion 70 is formed of a cylindrical rod body which has a fixed outer diameter in the axial direction. Specifically, as illustrated in FIGS. 4 and 5, the shaft portion 70 has linear portions 71, 73, and 75 linearly disposed along the linear sections 61, 63, and 65 of the transport path 60, and curved portions 72, 74 curvedly disposed along the curved sections 62, 64 of the transport path 60.

The curved portion 74 is disposed at the curved section 64 having a curvature greater than the curvature of the curved section 62, and thus the curved portion 74 has a curvature greater than the curvature of the curved portion 72. It is to be noted that the bending angle of the curved portion 74 is also made greater than the bending angle of the curved portion 72. The curved portion 72 is an example of a first curved portion, and the curved portion 74 is an example of a second curved portion.

It is to be noted that although the shaft portion 70 has a curved portion curvedly disposed along the curved section 66 of the transport path 60, and illustration of the curved portion is omitted.

As illustrated in FIG. 4, one end of the shaft portion 70 is rotatably supported by a sidewall 30S of the storage 30B of the remover 30. A gear (not illustrated), to which a rotational force is transmitted from the driving motor 59, is fixed to the one end of the shaft portion 70. Thus, the shaft portion 70 is rotationally driven by the driving motor 59.

The screw blades 80 are designed to transport toner while pushing the toner in one of the axial directions of the shaft portion 70 by the rotation of the shaft portion 70 with a transport surface which faces one (the side on the waste toner box 42) of sides in the axial directions of the shaft portion 70. Specifically, as illustrated in FIGS. 4 and 5, the screw blades 80 have large-diameter portions 81 formed on the outer circumferential surface of the linear portions 71, 73, and 75 of the shaft portion 70, small-diameter portions 82, 84 formed on the outer circumferential surface of the curved portions 72, 74 of the shaft portion 70, and large-diameter portions 87, 89 formed on the outer circumferential surface of the curved portions 72, 74 of the shaft portion 70.

In this exemplary embodiment, the screw blades 80 are continuously formed on the outer circumferential surface of the shaft portion 70. In other words, the screw blades 80 are formed in a continuous spiral shape. It is to be noted the screw blades 80 may be continuously formed at the large-diameter portion 81, 87, and 89 and the small-diameter portions 82, 84, and may be disconnected at least one of the boundaries of the large-diameter portion 81, 87, and 89 and the small-diameter portions 82, 84, for instance.

It is to be noted the large-diameter portions 81, the small-diameter portions 82, 84, and the large-diameter portions 87, 89 have the same arrangement interval. The arrangement interval is an interval (see an interval L of FIG. 4) in the axial direction of the shaft portion 70 at the radially inner side (the side near the shaft portion 70) of the screw blades 80, and is a synonym of the spiral pitch. The spiral pitch refers to the axial length per 360 degrees (one circumference) in the circumferential direction of the shaft portion 70 of the screw blades 80.

The outer diameter of the small-diameter portions 82, 84 is made smaller than the outer diameter of the large-diameter portions 81. In other words, the screw blades 80 have the small-diameter portions 82, 84 having an outer diameter at the curved portions 72, 74, made smaller than the outer diameter of the linear portions 71, 73, and 75.

As illustrated in FIG. 4, multiple (specifically, three) small-diameter portions 82 are formed in the axial direction of the curved portion 72. The large-diameter portions 87 are each formed between small-diameter portions 82. The outer diameter of the large-diameter portions 87 is made larger than the outer diameter of the small-diameter portions 82. Specifically, the outer diameter of the large-diameter portions 87 is set to be the same as the outer diameter of the large-diameter portions 81. As long as the outer diameter of the large-diameter portions 87 is greater than the outer diameter of the small-diameter portions 82, the outer diameter of the large-diameter portions 87 may be different from the outer diameter of the large-diameter portions 81.

Each small-diameter portion 82 and each large-diameter portion 87 are formed on the outer circumferential surface of the curved portion 72, 360 degrees in the circumferential direction of the curved portion 72. Thus, in the curved portion 72, the screw blades 80 are formed in the order of a small-diameter portion 82, a large-diameter portion 87, a small-diameter portion 82, a large-diameter portion 87, and a small-diameter portion 82 every 360 degrees in the circumferential direction facing the downstream side (the side on the waste toner box 42) of the transport direction.

As illustrated in FIG. 5, multiple (specifically, two) small-diameter portions 84 are formed in the axial direction of the curved portion 74. The outer diameter of the small-diameter portions 84 is set to be the same as the outer diameter of the small-diameter portions 82.

The large-diameter portions 89 are each formed between small-diameter portions 84. The outer diameter of the large-diameter portions 89 is made larger than the outer diameter of the small-diameter portions 84. Specifically, the outer diameter of the large-diameter portions 89 is set to be the same as the outer diameter of the large-diameter portions 81. It is to be noted as long as the outer diameter of the large-diameter portions 89 is greater than the outer diameter of the small-diameter portion 84, the outer diameter of the large-diameter portions 89 may be different from the outer diameter of the large-diameter portions 81.

Each small-diameter portion 84 is formed on the outer circumferential surface of the curved portion 74, 720 degrees in the circumferential direction of the curved portion 74. The large-diameter portions 89 are formed on the outer circumferential surface of the curved portion 74, 360 degrees in the circumferential direction of the curved portion 74. Thus, in the curved portion 74, the screw blades 80 are formed in the order of a small-diameter portion 84, a small-diameter portion 84, a large-diameter portion 89, a small-diameter portion 84, and a small-diameter portion 84, every 360 degrees in the circumferential direction facing the downstream side (the side on the waste toner box 42) of the transport direction.

Like this, the small-diameter portions 84 have a wider range continuously formed in the shaft portion 70 than the range continuously formed, in the shaft portion 70, of the small-diameter portions 82 formed in the curved portion 72. In other words, the range of the small-diameter portions 82, 84 continuously formed in the shaft portion 70 is wider in the curved portion 74 having a relatively large curvature than in the curved portion 72 having a relatively small curvature.

It is to be noted the transport member 56 is composed of an elastically deformation resin (elastomer) as an example, and the shaft portion 70 is disposed in an elastically deformed state at the curved portions 72, 74 of the transport path 60.

(Operation of this Exemplary Embodiment)

Next, the operation according to this exemplary embodiment will be described.

In this exemplary embodiment, remaining toner on the surface of the photoconductor drum 20 after transfer is removed by the blade 30A of the remover 30, and the toner is stored in the storage 30B (see FIG. 2).

The toner stored in the storage 30B is pushed with the transport surface of the screw blades 80 and transported to the waste toner box 42 by the shaft portion 70 of the transport member 56, which is rotationally driven by the driving motor 59 as illustrated in FIG. 4.

Figure 6:
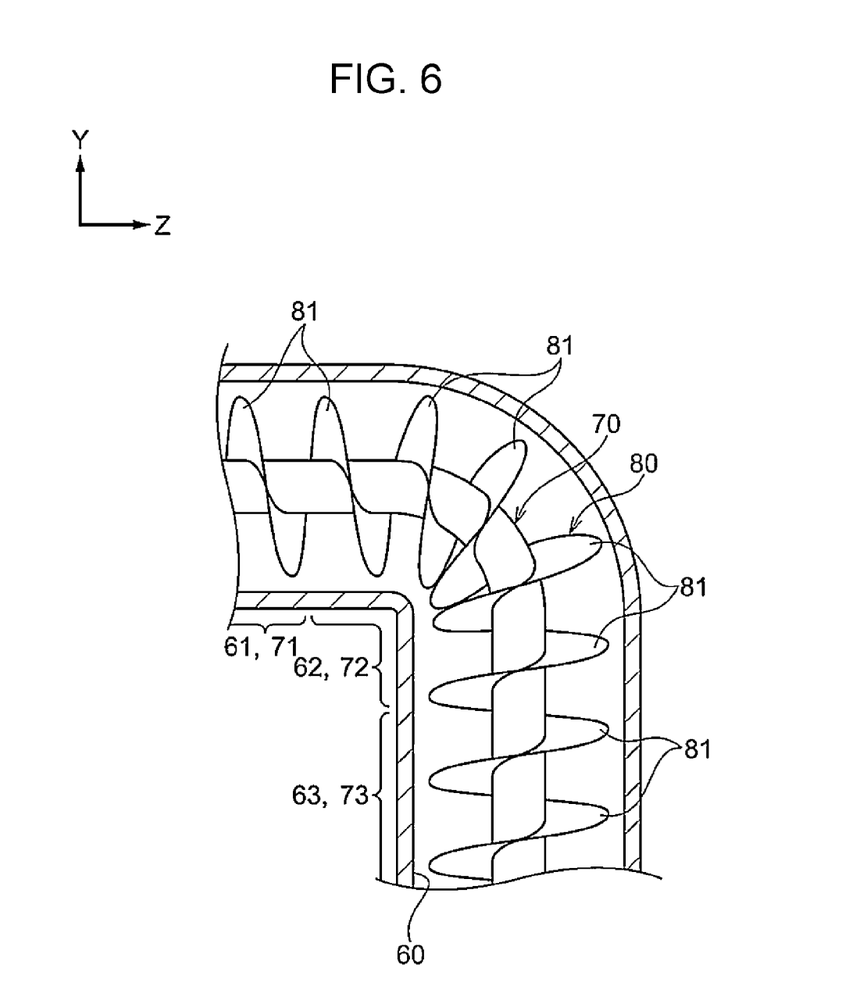
FIG. 6 is a cross sectional view illustrating the configuration of a curved section of a transport path in a transport device according to a comparative example.

Here, when the outer diameter of the screw blades 80 at the curved portions 72, 74 of the shaft portion 70 is the same as the outer diameter at the linear portions 71, 73, and 75, specifically, when the outer diameter of the entire screw blades 80 is fixed to the outer diameter of the large-diameter portions 81 (see a first comparative example of FIG. 6), the interval between the screw blades 80 in the axial direction at the radially outside end is narrowed inside the curved sections 62, 64, and 66 of the transport path 60.

Thus, toner may be compressed, and the toner may be condensed inside the curved sections 62, 64, and 66. Consequently, a transportation problem of toner may occur.

Also, the screw blades 80 may come into contact with each other inside the curved sections 62, 64, and 66. Consequently, torque up or damage of the screw blades 80 may occur.

In contrast, in this exemplary embodiment, as illustrated in FIGS. 4 and 5, the screw blades 80 have the small-diameter portions 82, 84 having an outer diameter which is made smaller in the curved portions 72, 74 than in the linear portions 71, 73, and 75.

For this reason, in this exemplary embodiment, the interval between the screw blades 80 in the axial direction at the radially outside end is unlikely to be narrowed inside the curved sections 62, 64 of the transport path 60, as compared with the first comparative example. Consequently, in this exemplary embodiment, toner is unlikely to be compressed, and condensation of toner is reduced inside the curved sections 62, 64, as compared with the first comparative example. Therefore, in this exemplary embodiment, the likelihood of a transportation problem of toner is reduced, as compared with the first comparative example.

In this exemplary embodiment, in the curved portion 72, each large-diameter portion 87 is formed between small-diameter portions 82. Also, in the curved portion 74, each large-diameter portion 89 is formed between small-diameter portions 84. For this reason, the transport capability of transporting toner is increased, as compared with the case (the second comparative example) where all the screw blades 80 at the curved portions 72 and 74 are small-diameter portions 82, 84.

In this exemplary embodiment, each small-diameter portion 82 is formed on the outer circumferential surface of the curved portion 72, 360 degrees in the circumferential direction of the curved portion 72. Each small-diameter portion 84 is formed on the outer circumferential surface of the curved portion 74, 720 degrees in the circumferential direction of the curved portion 74. In other words, the small-diameter portions 82, 84 are formed 360 degrees or greater in the circumferential direction of the curved portions 72, 74.

For this reason, when the shaft portion 70 is rotated, the small-diameter portions 82, 84 are disposed inside the curved sections 62, 64 of the transport path 60 at any rotation angle. Therefore, toner is unlikely to be compressed, and condensation of toner is reduced regardless of the rotation angle of the shaft portion 70, as compared with the case (the third comparative example) where the small-diameter portions 82, 84 are formed less than 360 degrees in the circumferential direction of the curved portions 72, 74.

In this exemplary embodiment, the small-diameter portions 84 (720 degrees) formed at the curved portion 74 have a wider range continuously formed in the shaft portion 70 than the range continuously formed, in the shaft portion 70, of the small-diameter portions 82 (360 degrees) formed at the curved portion 72, the curved portion 74 having a curvature greater than the curvature of the curved portion 72.

Therefore, the transport capability is increased at the curved portion 72, and condensation of the powder material is reduced at the curved portion 74, as compared with the case (the fourth comparative example) where the range formed in the shaft portion 70 of the screw blades 80 is the same regardless of the curvature of the curved portions 72, 74.

(Modification of Shaft Portion 70)

Figure 7:
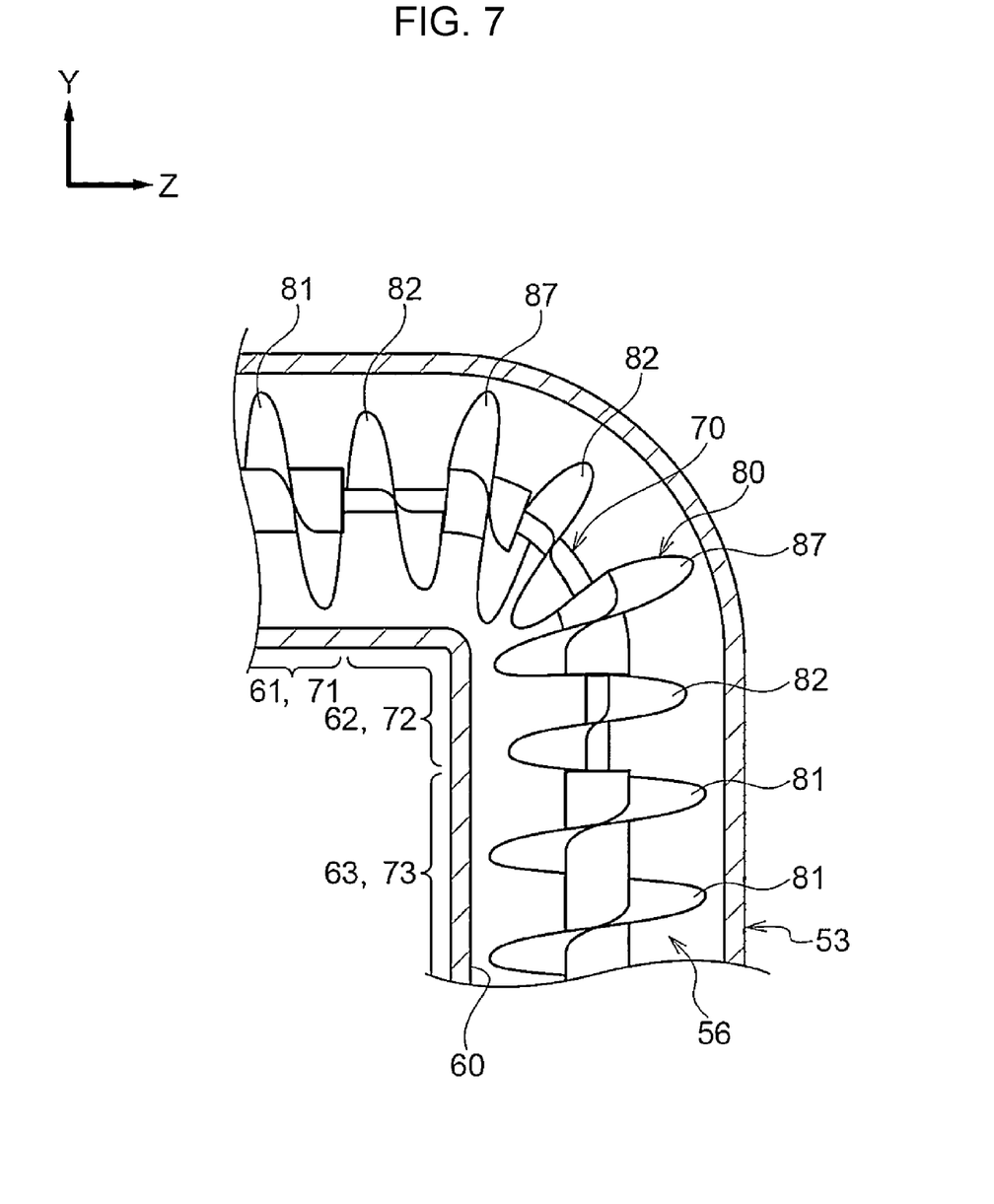
FIG. 7 is a cross sectional view illustrating a modification of a shaft portion of a transport member according to this exemplary embodiment.

In this exemplary embodiment, the shaft portion 70 has a fixed outer diameter. However, without being limited to this, for instance, as illustrated in FIG. 7, the outer diameter of the shaft portion 70 may be smaller than the outer diameter of the linear portions 71, 73, and 75 only in the section where the small-diameter portions 82, 84 are formed in the curved portions 72, 74.

With this configuration, the transport area of the small-diameter portions 82, 84 is increased, and the transport capability is enhanced, as compared with the case where the outer diameter of the shaft portion 70 is the same as the outer diameter of the linear portions 71, 73, and 75.

In addition, with the configuration of this modification, the rigidity of the shaft portion 70 is increased, as compared with the case where (the fifth comparative example) the outer diameter of the shaft portion 70 is made smaller than the outer diameter of the linear portions 71, 73, and 75 over the entire curved portions 72, 74.

It is to be noted that the outer diameter of the shaft portion 70 is made smaller than the outer diameter of the linear portions 71, 73, and 75 only in the section where the small-diameter portions 82, 84 are formed in the curved portions 72, 74 in this modification. However, without being limited to this, for instance, the outer diameter of the shaft portion 70 may be made smaller than the outer diameter of the linear portions 71, 73, and 75 over the entire curved portions 72, 74.

(Modification of Screw Blades 80)

Figure 8:
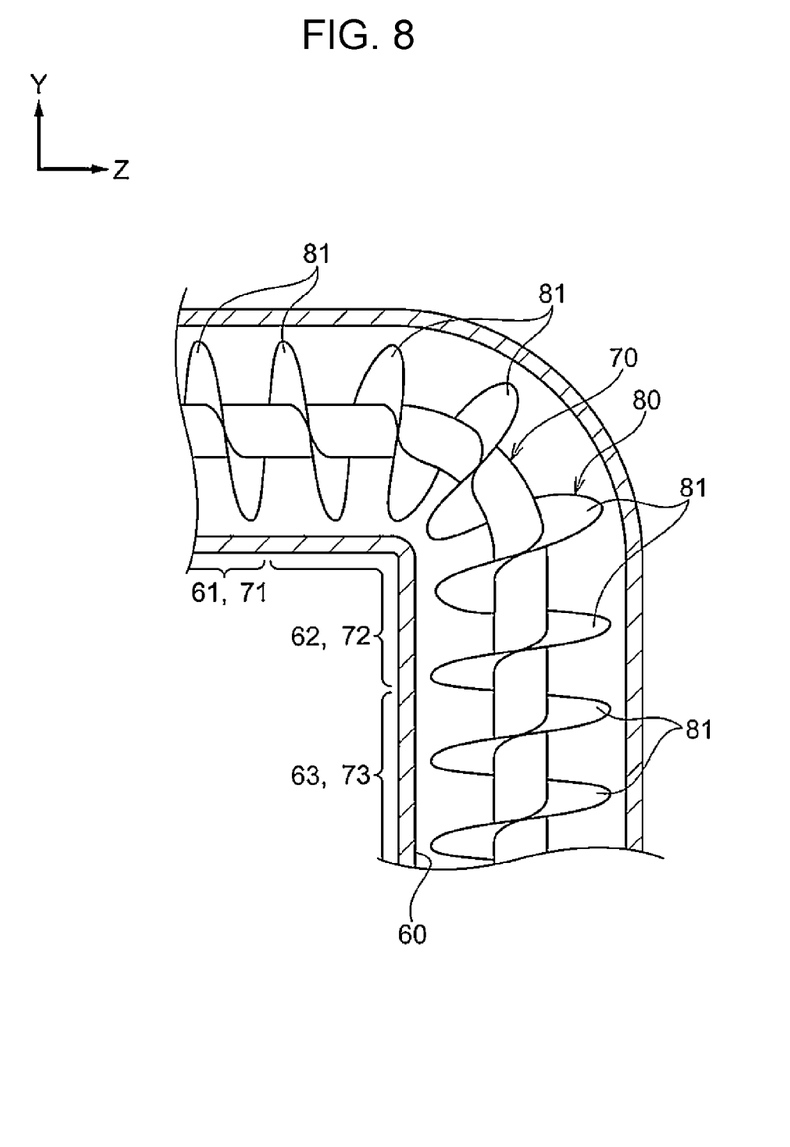
FIG. 8 is a cross sectional view illustrating a modification of screw blades of the transport member according to this exemplary embodiment.

In this exemplary embodiment, the screw blades 80 have the large-diameter portions 81, 87, and 89 and the small-diameter portions 82, 84. However, without being limited to this, for instance, as illustrated in FIG. 8, the outer diameter of the entire blades 80 is fixed to the outer diameter of the large-diameter portions 81, and the arrangement interval (spiral pitch) is larger in the curved portions 72, 74 than in the linear portions 71, 73, and 75.

With this configuration, the interval between the screw blades 80 in the axial direction at the radially outside end is unlikely to be narrowed inside the curved sections 62, 64, and 66 of the transport path 60, as compared with the case where (the sixth comparative example) the arrangement interval of the screw blades 80 is the same between the curved portions 72, 74 of the shaft portion 70 and the linear portions 71, 73, and 75. Consequently, in this exemplary embodiment, toner is unlikely to be compressed, and condensation of toner is reduced inside the curved sections 62, 64, and 66, as compared with the sixth comparative example. Therefore, in this exemplary embodiment, the likelihood of a transportation problem of toner is reduced, as compared with the sixth comparative example.

(Other Modifications)

In this exemplary embodiment, not only the small-diameter portions 82, 84, but also the large-diameter portions 87, 89 are formed on the outer circumferential surface of the curved portions 72, 74 of the shaft portion 70. However, without being limited to this, for instance, all the screw blades 80 at the curved portions 72, 74 are small-diameter portions 82, 84.

In this exemplary embodiment, the small-diameter portions 82, 84 are formed 360 degrees or greater in the circumferential direction of the curved portions 72, 74. However, without being limited to this, for instance, the small-diameter portions 82, 84 may be formed less than 360 degrees in the circumferential direction of the curved portions 72, 74.

In this exemplary embodiment, the small-diameter portions 84 formed at the curved portion 74 have a wider range continuously formed in the shaft portion 70 than the range continuously formed, in the shaft portion 70, of the small-diameter portions 82 formed at the curved portion 72, the curved portion 74 having a curvature greater than the curvature of the curved portion 72. However, without being limited to this, for instance, the range continuously formed in the shaft portion 70 may be the same between the small-diameter portions 82 and the small-diameter portions 84. Specifically, similarly to the curved portion 74, in the curved portion 72, the screw blades 80 may be formed in the order of a small-diameter portion 82, a small-diameter portion 82, a large-diameter portion 87, a small-diameter portion 82, and a small-diameter portion 82, every 360 degrees in the circumferential direction facing the downstream side of the transport direction. Instead, similarly to the curved portion 72, in the curved portion 74, the screw blades 80 may be formed in the order of a small-diameter portion 84, a large-diameter portion 89, a small-diameter portion 84, a large-diameter portion 89, and a small-diameter portion 84, every 360 degrees in the circumferential direction facing the downstream side of the transport direction.

In this exemplary embodiment, the outer diameter of the small-diameter portions 84 formed in the curved portion 74 having a relatively large curvature is set to be the same as the outer diameter of the small-diameter portions 82 formed in the curved portion 72. However, without being limited to this, for instance, the outer diameter of the small-diameter portions 84 may be made smaller than the outer diameter of the small-diameter portions 82. With this configuration, the transport capability is increased at the curved portion 72, and condensation of the powder material is reduced at the curved portion 74, as compared with the case where the outer diameters of the small-diameter portions 82, 84 are the same regardless of the curvature of the curved portions 72, 74. It is to be noted when the outer diameter of the small-diameter portions 84 is made smaller than the outer diameter of the small-diameter portions 82, the range continuously formed, in the shaft portion 70, of the small-diameter portions 84 may be the same as the range continuously formed, in the shaft portion 70, of the small-diameter portions 82.

In this exemplary embodiment, the transport device 50 is a device that transports toner, which is removed from the photoconductor drum 20, from the remover 30 to the waste toner box 42. However, without being limited to this, for instance, the transport device may transport toner from the toner cartridge 40 to the developing device 28.

In this exemplary embodiment, developing agent G has been used as the powder material. However, without being limited to this, materials in a powdery state may be used as the powder material.

The invention is not limited to the above-described exemplary embodiment, and various modifications, changes, and improvements may be made in a scope without departing from the essence of the invention. For instance, the modifications described above may be configured by combining multiple components as needed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transport member comprising:
a shaft portion having a linear portion that is linearly disposed along a linear section of a transport path, and a curved portion that is curvedly disposed along a curved section of the transport path; and
screw blades that are spirally formed on an outer circumferential surface of the linear portion and the curved portion, and that transport a powder material by rotation of the shaft portion in one of axial directions of the shaft portion, the screw blades having a small-diameter portion which has an outer diameter smaller in the curved portion than in the linear portion.

2. The transport member according to claim 1,
wherein in the screw blades, a plurality of small-diameter portions, each of which is the small-diameter portion, are formed in an axial direction of the curved portion, and
a large-diameter portion made larger in outer diameter than the small-diameter portion is formed between the plurality of small-diameter portions.

3. The transport member according to claim 1,
wherein the plurality of small-diameter portions are each formed 360 degrees or greater in a circumferential direction of the curved portion.

4. The transport member according to claim 2,
wherein the plurality of small-diameter portions are each formed 360 degrees or greater in a circumferential direction of the curved portion.

5. The transport member according to claim 1,
wherein an outer diameter of the shaft portion is smaller than an outer diameter of the linear portion only in a section, in which the plurality of small-diameter portions are formed, of the curved portion.

6. The transport member according to claim 2,
wherein an outer diameter of the shaft portion is smaller than an outer diameter of the linear portion only in a section, in which the plurality of small-diameter portions are formed, of the curved portion.

7. The transport member according to claim 3,
wherein an outer diameter of the shaft portion is smaller than an outer diameter of the linear portion only in a section, in which the plurality of small-diameter portions are formed, of the curved portion.

8. The transport member according to claim 4,
wherein an outer diameter of the shaft portion is smaller than an outer diameter of the linear portion only in a section, in which the plurality of small-diameter portions are formed, of the curved portion.

9. The transport member according to claim 1,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

10. The transport member according to claim 2,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

11. The transport member according to claim 3,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

12. The transport member according to claim 4,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

13. The transport member according to claim 5,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

14. The transport member according to claim 6,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

15. The transport member according to claim 7,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

16. The transport member according to claim 8,
wherein the shaft portion has, as the curved portion, a first curved portion and a second curved portion having a curvature greater than a curvature of the first curved portion, and
the plurality of small-diameter portions have a wider range continuously formed in the shaft portion or a smaller outer diameter in the second curved portion than in the first curved portion.

17. A transport device comprising:
the transport member according to claim 1;
the transport path in which the transport member is disposed; and
a driver that rotationally drives the shaft portion of the transport member.

18. A transport member comprising:
a shaft portion having a linear portion that is linearly disposed along a linear section of a transport path, and a curved portion that is curvedly disposed along a curved section of the transport path; and
screw blades that are spirally formed on an outer circumferential surface of the linear portion and the curved portion, and that transport a powder material by rotation of the shaft portion in one of axial directions of the shaft portion, the screw blades having an arrangement interval larger in the curved portion than in the linear portion.

19. An image forming device comprising:
an image former that forms an image on a recording medium using toner; and
the transport device according to claim 17, that transports the toner as a powder material.

\* \* \* \* \*